Oct. 27, 1964     J. G. SWARTZ     3,154,668
HEATER COMPARTMENT FOR LUNCH BOX
Filed June 5, 1961     2 Sheets-Sheet 1

John G. Swartz
INVENTOR.

BY Clarence A. O'Brien
and Harvey B. Jacobson
Attorneys

Oct. 27, 1964  J. G. SWARTZ  3,154,668
HEATER COMPARTMENT FOR LUNCH BOX
Filed June 5, 1961  2 Sheets-Sheet 2
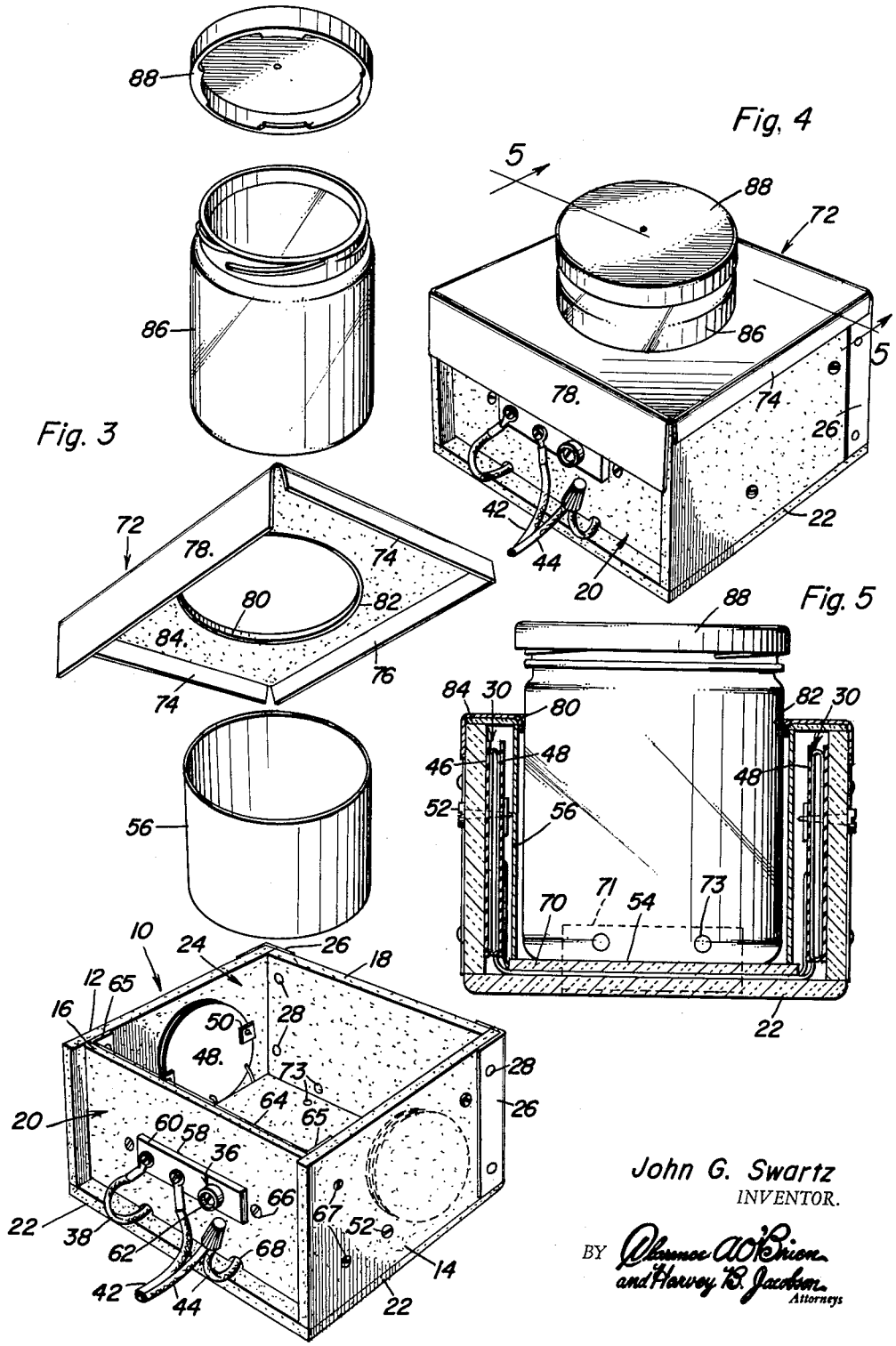
John G. Swartz
INVENTOR.

United States Patent Office 3,154,668
Patented Oct. 27, 1964

3,154,668
HEATER COMPARTMENT FOR LUNCH BOX
John G. Swartz, Box 226, Luckey, Ohio
Filed June 5, 1961, Ser. No. 114,795
4 Claims. (Cl. 219—387)

This invention relates to heating devices, and more particularly to devices for heating food and adapted to fit within a conventional lunch box.

This application is a continuation-in-part of my co-pending application Serial No. 801,277, filed March 23, 1959, now abandoned.

Briefly, the invention comprises an insulated compartment containing electric heating coils located between the inner surfaces of the insulated compartment and the outer surface of a heat conducting cylinder contained within the insulated compartment. The heating coils are connected to a conventional source of electricity and controlled by a conventional thermostat. The food to be heated by the device is located within a glass container such as a conventional glass jar which fits snugly within the heat conducting cylinder. When the heating coils are energized, the heat therefrom passes to the heat conducting cylinder, whereby the heat is then evenly distributed to the outer surface of the glass jar containing the food. The entire assembly fits snugly within a portion of a conventional lunch box, and may easily be removed therefrom.

Accordingly, it is a primary object of this invention to provide a device for heating food wherein the food may be contained within a conventional ceramic jar composed of ordinary glass, and the device being so designed and arranged that it distributes heat evenly to the glass so as to prevent cracking thereof. This is a distinct advantage over conventional food heaters which do not distribute the heat evenly to the food containing compartment, and therefore if glass is used in the construction of the food containing compartment, the glass must be of the more expensive Pyrex type.

Accordingly, it is another object of the invention to provide a device for electrically heating food wherein the food compartment is composed of ordinary glass.

It is still another object of the invention to provide a device for heating food wherein the food compartment comprises an ordinary commercial type glass jar, such as a pickle jar, and the jar being arranged within the device in such a manner that it can be quickly and easily removed therefrom without requiring any special tools or skill.

It is yet another object of the invention to provide a device for heating food which has adjustable thermostatic means for automatically maintaining the food at any desired temperature.

It is yet another object of the invention to provide a device for heating food which will fit snugly within ordinary lunch boxes, and may be used either within the lunch box, or separately therefrom.

It is still another object of the invention to provide a device for heating food which has removable parts for permitting easy access to the interior thereof for repair and cleaning.

It is still yet another object of the invention to provide a device for heating food which is extremely economical to construct or manufacture, is durable and reliable in use, and requires a minimum of maintenance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an exploded view of the invention in perspective;

FIGURE 4 is a perspective view of the assembled heating device;

FIGURE 5 is a cross sectional vertical view taken substantially upon a plane of line 5—5 in FIGURE 4;

Figure 1:
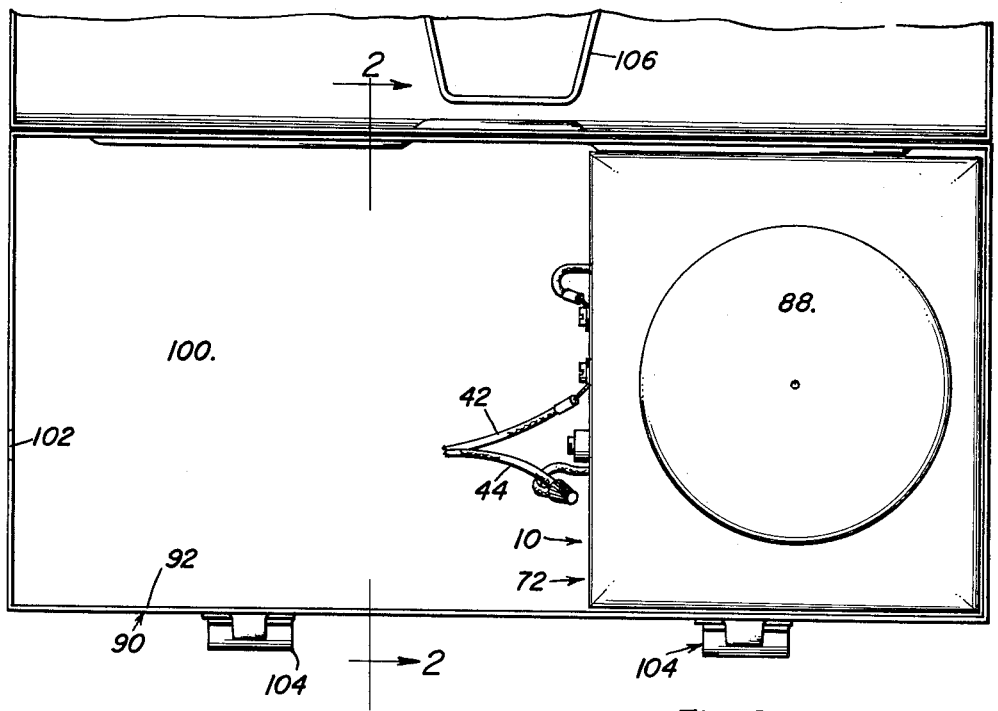
FIGURE 1 is a plan view of the heating device shown installed with a conventional lunch box.

Referring to the drawings, and particularly FIGURES 3 through 5, it can be seen that the heating device comprises an insulated compartment or housing 10 of box-like design and construction, and comprising two parallel spaced side walls 12 and 14 of rectangular shape, and two spaced vertical end walls 16 and 18 also of rectangular shape and rigidly connected at their ends to the side walls 12 and 14. The front end wall 16 is slightly inset from the ends of the side walls so as to form a control chamber 20. A rectangular floor 22 extends between the vertical walls and encloses the bottoms of the control and heating compartments.

The rear wall 18 is secured to the side walls 12 and 14 by means of two angle members 26 which overlap the abutting ends of the walls and are secured thereto by means of rivets 28.

Figure 6:
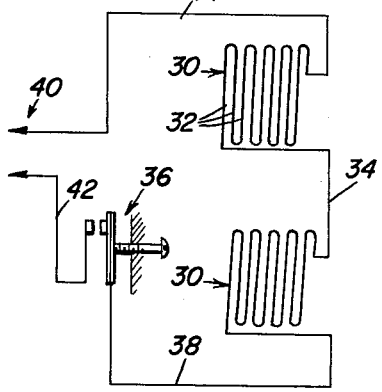
FIGURE 6 is a diagrammatic view of the electric system used in the invention.

Supported on the inside surfaces of each of the side walls is an electric heating element 30. Each of the heating elements 30 are composed of a plurality of parallel resistor wires 32. As shown in FIGURE 6, the heating elements 30 are connected in series with one another by means of a conductor 34, and in series with an adjustable thermostat 36 by means of a conductor 38. One of the heating elements and the adjustable thermostat are connected to a conventional male type electric plug 40, by means of the conductors 42 and 44.

As shown in FIGURE 5, the heating elements 30 are sandwiched between two circular plates 46 and 48 composed of electric insulating material such as mica or isinglass which are retained on the side walls 12 and 14 by means of nuts 50 which overlap the edges of the plates 48 and are pressed thereagainst by means of screws 52 which extend through the side walls and are threaded into the ends of the nuts.

A floor plate 54 is secured to the central upper surface of the floor 22 by conventional means. Supported on the floor plate 54 is a heat conducting cylinder 56 which extends upwardly therefrom to an elevation in line with the upper edges of the side walls 12 and 14. The heat conducting cylinder 56 is preferably composed of a metal having high heat conducting qualities such as aluminum or copper.

Mounted in a rectangular opening 58 in the end wall 16 is a thermostat housing 60 of rectangular shape which supports and contains the adjustable thermostat 36. A screw 62 that may be rotated by means of a conventional screw driver is exposed and connected to the adjustable thermostat whereby rotation of the screw varies the setting of the thermostat. The housing 60 is fixed by means of screws 66 and end tabs (not shown) to a sheet 64 which covers the inner surface of the front wall 16. The sheet 64 has end flanges 65 which are secured to the side wall 12 and 14 by means of screws 67. The sheet 64 is also composed of heat conducting metal and contacts the periphery of cylinder 56 so as to transfer heat therefrom directly to thermostat 36 which controls the temperature of jar 86.

An angle member 71 extends over the rear bottom corner of housing 10 and is secured to wall 18 and floor 22 by rivets 73.

The wires 38 and 42 that lead from the housing 60 and thermostat 36 extends through arcuate slots 68 in the bottom edge of the wall 16 and under the floor plate 54 to the heating element. The plate 54 is provided with grooves 70 for the conductors 38 and 44.

A rectangular cover plate 72 preferably composed of metal extends over and covers the upper opening in the insulating compartment or housing 10. The cover plate 72 has four integral and downwardly extending flanges 74, 76 and 78. The flange 78 is slightly higher than the other flanges and extends over the control chamber 20 as shown in FIGURE 4. The cover 72 has a central circular flange 82. The circular flange 82 extends into the cylinder 56 and maintains it within a proper central position. A layer of insulating material 84 covers the underside of the cover 72. The insulating material 84 and the insulating material comprising the insulating compartment of housing 10 is conventional, and preferably comprises rigid sheeting made of compressed asbestos fiber.

A conventional glass jar 86 fits snugly within the heat conducting cylinder 56, and is sealed by means of a conventional screw type cap 88. The jar 86 is of a conventional type such as those in which pickles and other foodstuffs are sold in.

Figure 2:
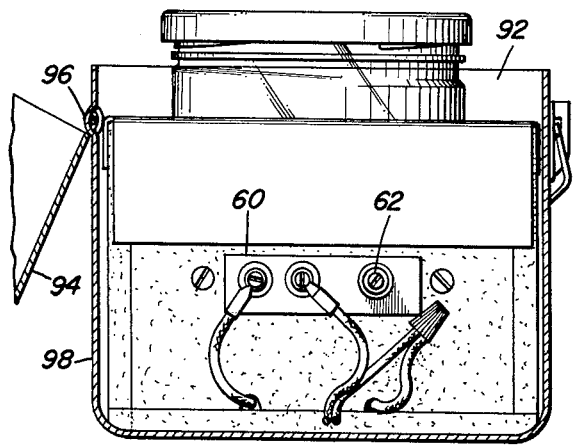
FIGURE 2 is a vertical cross sectional view taken substantially on the plane of line 2—2 of FIGURE 1.

FIGURES 1 and 2 show my heating device installed within a conventional lunch box assembly 90. The lunch box comprises a conventional rectangular food containing portion 92 having four vertical side walls and a bottom and a cover 94 hinged at 96 to a rear wall 98 of the food containing portion 92. As shown in FIGURE 1, the heater compartment fits snugly within either end of the lunch box so that a portion 100 may be used for storing cold foods such as sandwiches while the heater compartment may be used for storing foods which are to be served hot. The wires or conductors 44 may extend through a notch 102 in an upper edge of one of the walls of the food containing portion 92.

The lunch box 90 has conventional latches 104 for holding the top 94 in the closed position. The top 94 is preferably dome-shaped and has a spring clip 106 for retaining a thermos bottle therein. In use, any food which is preferably served hot is placed within the glass jar 86 which in turn is inserted into the heat conducting cylinder 56. The entire heating device is then placed within the lunch box 90 along with other food in the food containing portion 100. The owner of the box may carry it to his place of work in a conventional manner, and before he is ready to consume his lunch, he plugs in the plug 40 into a conventional electric outlet means. The heating elements 30 rapidly heat the heat conducting cylinder 56 which in turn evenly distributes heat to the glass container 86. As explained above, this even distribution of heat prevents cracking of the jar. The thermostat 36 maintains the food at the desired temperature once it has become heated. Thus it is apparent that the user of the lunch box may plug in the plug 40 a few minutes or even several hours before he is prepared to consume his lunch.

Since the heating device is removable from the lunch box, it is apparent that it may be used separately therefrom. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A self-contained food heating device comprising a rectangular housing of a size so as to be snugly received within a portion of the rectangular food storing compartment of a conventional lunch box, electric heating elements secured to inner surfaces of the housing, a hollow open-ended cylindrical heat conducting member within the housing, means centrally locating said cylindrical member between the heating elements, a food container removably received snugly within said cylindrical member, a top on said housing, said top including a centrally located aperture therethrough, said aperture having a diameter substantially equal to the diameter of said cylindrical member, said means for centrally locating said cylindrical member consisting of a depending peripheral flange about said aperture, said depending flange being snugly received within the upper end of said cylindrical member, one wall of said rectangular housing being offset inwardly from the edges of the two adjacent walls so as to form a chamber exterior of said housing, and an adjustable thermostat connected in series with said heating elements, said thermostat being located within said chamber, and means contacting said cylindrical member for transferring heat therefrom to said thermostat.

2. The device of claim 1 wherein said heating elements consist of two elements secured on opposed walls of said housing with the cylindrical heat conducting member located therebetween.

3. A self-contained food heating device comprising a housing of a size so as to be snugly received within a portion of the food storing compartment of a conventional lunch box, said housing including a bottom and an upwardly extending peripheral wall thereabout, electric heating elements mounted within the housing in spaced relation to each other, a hollow heat conducting member within the housing, said heat conducting member having an opening therein, means centrally locating said heat conducting member between the heating elements, a food container removably received snugly within said heat conducting member through the opening therein, a top on said housing, said top including a centrally located aperture therethrough, said aperture having an area substantially equal to the cross-sectional area of the heat conducting member, said means for centrally locating said heat conducting member consisting of depending flange means about said aperture, said depending flange means being snugly received within the upper end of said conducting member, said peripheral wall including a portion thereof offset inwardly so as to form a chamber exterior of said housing, a thermostat connected in series with said heating elements, said thermostat being located within said chamber, and means contacting said heat conducting member for transferring heat therefrom to said thermostat.

4. A self-contained food heating device comprising a housing, said housing including a bottom and an upwardly extending peripheral wall thereabout, electric heating elements mounted within the housing in spaced relation to each other, a hollow open-ended heat conducting member within the housing, means associated with the housing centrally locating the heat conducting member between the elements, said heat conducting member being adapted to removably and snugly receive a food container therein, said peripheral wall including a portion thereof offset inwardly so as to form a chamber exterior of said housing, a thermostat connected in series with said heating elements, said thermostat being located within said chamber, and means contacting said conducting member for transferring heat therefrom to said thermostat.

References Cited in the file of this patent

UNITED STATES PATENTS

| | | |
|---|---|---|
| 1,762,171 | Goldsmith | June 10, 1930 |
| 1,979,222 | Goodwin | Oct. 30, 1934 |
| 2,006,059 | Rudorff | June 25, 1935 |
| 2,500,241 | Brown | Mar. 14, 1950 |
| 2,577,870 | Aston | Dec. 11, 1951 |
| 2,659,802 | Garrett et al. | Nov. 17, 1953 |
| 2,700,097 | Morey | Jan. 18, 1955 |
| 2,767,300 | De Verter | Oct. 16, 1956 |
| 2,889,443 | Dobmeier | June 2, 1959 |